(12) United States Patent
Ryu

(10) Patent No.: US 10,682,914 B2
(45) Date of Patent: Jun. 16, 2020

(54) BATTERY MANAGEMENT APPARATUS

(71) Applicant: LG Chem, Ltd., Seoul (KR)

(72) Inventor: Ho-Jin Ryu, Daejeon (KR)

(73) Assignee: LG Chem, Ltd. (KR)

( * ) Notice: Subject to any disclaimer, the term of this patent is extended or adjusted under 35 U.S.C. 154(b) by 32 days.

(21) Appl. No.: 16/071,329

(22) PCT Filed: Nov. 15, 2017

(86) PCT No.: PCT/KR2017/012959
§ 371 (c)(1),
(2) Date: Jul. 19, 2018

(87) PCT Pub. No.: WO2018/097536
PCT Pub. Date: May 31, 2018

(65) Prior Publication Data
US 2019/0039458 A1 Feb. 7, 2019

(30) Foreign Application Priority Data
Nov. 24, 2016 (KR) .......... 10-2016-0157679

(51) Int. Cl.
*B60K 6/28* (2007.10)
*B60L 3/00* (2019.01)
(Continued)

(52) U.S. Cl.
CPC ............. *B60L 3/0007* (2013.01); *B60K 6/28* (2013.01); *B60L 1/00* (2013.01); *B60L 3/0046* (2013.01);
(Continued)

(58) Field of Classification Search
CPC . B60K 6/28; B60L 1/00; B60L 3/0007; B60L 3/0046; B60L 3/0076; B60L 3/12;
(Continued)

(56) References Cited

U.S. PATENT DOCUMENTS 6,370,461 B1  4/2002 Pierce et al.
9,182,449 B2 * 11/2015 Gibbs ................... B60L 58/12
(Continued)

FOREIGN PATENT DOCUMENTS

CN  202115506 U  1/2012
CN  106114478 A  11/2016
(Continued)

OTHER PUBLICATIONS

International Search Report and Written Opinion for Application No. PCT/KR20171012959, dated Feb. 19, 2018 (10 pages).
(Continued)

*Primary Examiner* — Robert T Nguyen
(74) *Attorney, Agent, or Firm* — Lerner, David, Littenberg, Krumholz & Mentlik, LLP

(57) ABSTRACT

Disclosed is a technique of controlling an apparatus for managing a battery loaded in a vehicle. The battery management apparatus for managing a battery included in a vehicle includes an application module having a plurality of unit application modules that respectively perform a task at a predetermined cycle; an emergency recognition module configured to recognize an emergency situation of the vehicle; and a cycle changing module configured to change a task performance cycle of at least one unit application module when the emergency recognition module recognizes an emergency situation of the vehicle.

13 Claims, 6 Drawing Sheets

(51) Int. Cl.
  *B60L 3/12* (2006.01)
  *B60L 58/10* (2019.01)
  *H01M 10/42* (2006.01)
  *B60L 1/00* (2006.01)
  *G07C 5/02* (2006.01)
  *H01M 10/48* (2006.01)

(52) U.S. Cl.
  CPC ............... *B60L 3/0076* (2013.01); *B60L 3/12* (2013.01); *B60L 58/10* (2019.02); *G07C 5/02* (2013.01); *H01M 10/425* (2013.01); *H01M 10/486* (2013.01); *B60L 2240/545* (2013.01); *B60L 2240/547* (2013.01); *B60L 2240/549* (2013.01); *B60L 2250/26* (2013.01); *B60Y 2200/91* (2013.01); *B60Y 2200/92* (2013.01); *H01M 2010/4271* (2013.01); *H01M 2200/00* (2013.01); *H01M 2220/20* (2013.01); *Y02T 10/7005* (2013.01)

(58) Field of Classification Search
  CPC .... B60L 50/72; B60L 58/10; B60L 2240/545; B60L 2240/547; B60L 2240/549; B60L 2250/26; B60R 21/013; B60T 8/171; B60Y 2200/91; B60Y 2200/92; B60Y 2400/306; G07C 5/02; H01M 2/1083; H01M 10/42; H01M 10/425; H01M 10/486; H01M 2010/4271; H01M 2200/00; H01M 2220/20; Y02E 60/12; Y02T 10/7005
  See application file for complete search history.

(56) References Cited

U.S. PATENT DOCUMENTS

| | | | |
|---|---|---|---|
| 2003/0060980 A1 | 3/2003 | Prakah-Asante et al. | |
| 2007/0026711 A1 | 2/2007 | Chorian et al. | |
| 2010/0030431 A1* | 2/2010 | Potter | B60R 16/03 701/45 |
| 2015/0149007 A1 | 5/2015 | Kim et al. | |
| 2015/0234714 A1 | 8/2015 | Tsuchida et al. | |
| 2018/0134171 A1* | 5/2018 | Hyde | B60L 7/12 |

FOREIGN PATENT DOCUMENTS

| | | | |
|---|---|---|---|
| DE | 102011006510 A1 | | 10/2012 |
| JP | H08147030 A | | 6/1996 |
| JP | 2001-157310 A | | 6/2001 |
| JP | 2009-224262 A | | 10/2009 |
| JP | 2010233448 A | | 10/2010 |
| JP | 2011069782 A | * | 4/2011 |
| JP | 2012181131 A | | 9/2012 |
| KR | 10-0739080 B1 | | 7/2007 |
| KR | 10-2012-0079674 A | | 7/2012 |
| KR | 20120079674 A | * | 7/2012 |
| KR | 10-2015-0077771 A | | 7/2015 |
| WO | 2014045727 A1 | | 3/2014 |

OTHER PUBLICATIONS

Extended European Search Report including the Written Opinion for Application No. EP 17874975.0 dated Dec. 10, 2019, 7 pages.

* cited by examiner

BATTERY MANAGEMENT APPARATUS

The present application claims priority under 35 U.S.C. § 119 to Korean Patent Application No. 10-2016-0157679 filed on Nov. 24, 2016 in the Republic of Korea, and under 35 U.S.C. § 365 to PCT/KR2017/012959 filed on Nov. 24, 2016, the disclosures of which are incorporated herein by reference.

TECHNICAL FIELD

The present disclosure relates to a battery management technology, and more particularly, to a technique of controlling an apparatus for managing a battery loaded in a vehicle, for example a battery management system (BMS), to perform various tasks.

BACKGROUND

A battery is more broadly used in not only mobile devices such as mobile phones, laptop computers, smart phones and smart pads but also electric vehicles (EVs, HEVs, PHEVs) and mass storage devices.

The battery may be coupled to a battery management system (BMS) that controls the overall operations of the battery. In particular, the BMS includes a MCU and may perform several tasks. At this time, the MCU of the BMS may be configured to perform only one task at a time regardless of the number of cores. This is because performing several processes simultaneously may cause problems due to the crosstalk among the tasks. Further, if an error occurs at the MCU of the BMS, the vehicle may cause an accident, and thus a single task process is commonly used to block such a MCU error.

In this situation, various tasks performed by the BMS may be performed with specific periods. In addition, the task performance cycles are fixed and downloaded to the BMS in the form of software images, and it is generally impossible to arbitrarily change the cycles.

Thus, the BMS of a vehicle available at the present may not adaptively cope with various environmental conditions. In particular, the vehicle always has the risk of a traffic accident, but even in the accident situation, various tasks of the BMS are inevitably performed in the same cycle and form as the normal state. For this reason, it is difficult to quickly and appropriately cope with the accident, and it is not easy to precisely obtain and analyze accident-related information.

SUMMARY

The present disclosure is designed to solve the problems of the related art, and therefore the present disclosure is directed to providing a battery management apparatus, which is capable of handling an abnormal situation more quickly and appropriately and is easier and more advantageous in managing a battery by acquiring relevant information more accurately and in more detail; and a battery pack and a vehicle including the battery management apparatus.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

In one aspect of the present disclosure, there is provided a battery management apparatus for managing a battery included in a vehicle, comprising: an application module having a plurality of unit application modules that respectively perform a task at a predetermined cycle; an emergency recognition module configured to recognize an emergency situation of the vehicle; and a cycle changing module configured to change a task performance cycle of at least one unit application module when the emergency recognition module recognizes an emergency situation of the vehicle.

Here, the emergency recognition module may have a brake pressure measuring sensor for measuring a brake pressure.

In addition, the emergency recognition module may further have an impact detecting sensor for monitoring an impact applied to the vehicle.

In addition, the cycle changing module may turn on when the brake pressure measured by the brake pressure measuring sensor is a reference value or above, and change the task performance cycle when an impact is detected by the impact detecting sensor.

In addition, when the brake pressure measured by the brake pressure measuring sensor is a reference value or above, the cycle changing module may primarily change the task performance cycle with respect to a task of the at least one unit application module, and when an impact is detected by the impact detecting sensor, the cycle changing module may secondarily change the primarily changed task performance cycle.

In addition, the battery management apparatus may further include a memory module for storing information of the battery, and the memory module may record information data of the battery whenever a pressure is applied to a brake of the vehicle, and store the recorded information data when the brake pressure of the vehicle is a reference value or above.

In addition, as the unit application module, the application module may include at least one of a cell voltage measurement application for performing a task of measuring a voltage of each cell included in the battery, a current measurement application for performing a task of measuring a current flowing in the battery, a temperature measurement application for performing a task of measuring a temperature of the battery, a contactor measurement application for performing a task of measuring a voltage of a coil to control a contactor and a debug receiving application for performing a task of receiving debugging data from another device of the vehicle through controller area network (CAN) communication, and when an emergency situation of the vehicle is recognized, the cycle changing module may change a task performance cycle with respect to at least one unit application module, among the unit application modules.

In addition, when an emergency situation of the vehicle is recognized, the cycle changing module may reduce a task performance cycle with respect to at least one unit application module among the unit application modules included in the application module.

In addition, when the vehicle stops, the cycle changing module may restore the changed task performance cycle to an original cycle.

In addition, the cycle changing module may monitor a load of the battery management apparatus and increase a task performance cycle of a part of the unit application module of the application module according to the monitoring result.

In another aspect of the present disclosure, there is also provided a battery pack, comprising the battery management apparatus according to the present disclosure.

In another aspect of the present disclosure, there is also provided a vehicle, comprising the battery management apparatus according to the present disclosure.

According to an embodiment of the present disclosure, it is possible to change the performance cycles of various tasks performed by the battery management apparatus such as a BMS.

Thus, in the present disclosure, it is possible to adaptively handle various environmental conditions of the battery by changing the task performance cycles.

In particular, when a battery is mounted to a vehicle, the battery may be highly likely to be damaged or broken due to a traffic accident. However, according to an embodiment of the present disclosure, it is possible to quickly and appropriately perform related tasks in the event of a traffic accident or the like.

Moreover, it is possible to finely and quickly store status information of the battery in an emergency situation so that related contents may be more easily analyzed, and this may be very helpful in repairing and manufacturing the battery.

In addition, according to an embodiment of the present disclosure, it is possible to store and utilize appropriate information even when the memory capacity is not sufficiently secured.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
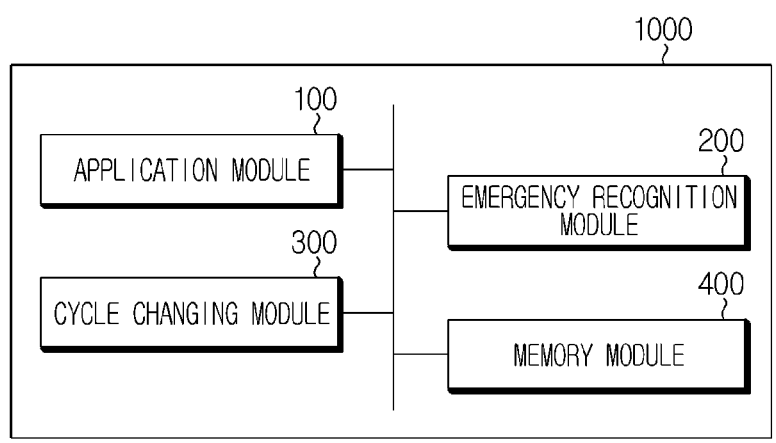
FIG. 1 is a block diagram schematically showing a functional configuration of a battery management apparatus according to an embodiment of the present disclosure.
Figure 2:
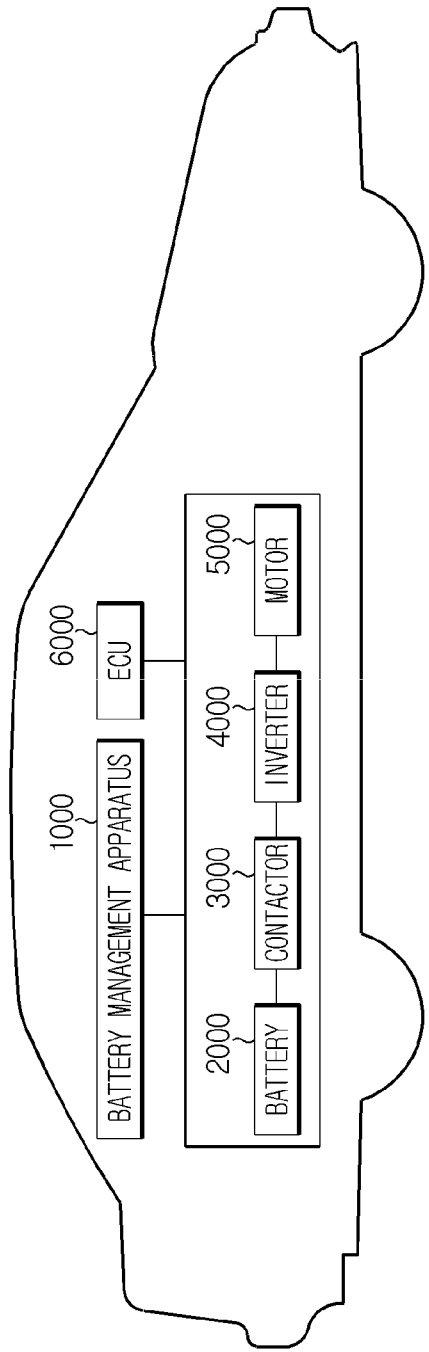
FIG. 2 is a schematically showing that the battery management apparatus according to an embodiment of the present disclosure included in a vehicle.

FIG. 1 is a block diagram schematically showing a functional configuration of a battery management apparatus 1000 according to an embodiment of the present disclosure. Also, FIG. 2 is a schematically showing that the battery management apparatus 1000 according to an embodiment of the present disclosure included in a vehicle.

Referring to FIG. 1, a battery management apparatus 1000 according to the present disclosure may include an application module 100, an emergency recognition module 200 and a cycle changing module 300. In addition, as shown in FIG. 2, the battery management apparatus 1000 according to the present disclosure may be connected to a battery included in a vehicle to manage the battery for the vehicle. However, in FIG. 2, components other than the battery management apparatus 1000, namely a battery 2000, a contactor 3000, an inverter 4000, a motor 5000 and an ECU 6000, may adopt components known in the art at the time of filing of this application and are not described in detail here.

The application module 100 may perform one or more tasks. In particular, the application module 100 may be configured to perform a plurality of tasks. To this end, the application module 100 may include a plurality of unit application modules. In addition, each unit application module may perform one or more predetermined tasks. Here, the task may mean various functions or operations accompanied for managing a battery, for example for measuring, estimating, calculating or diagnosing various states of the battery or controlling the battery. In the present disclosure, the tasks performed by the application module 100 are not limited to specific operations. Accordingly, various tasks known at the time of filing of this application, particularly various functions performed by a battery management system (BMS) of a battery pack included in a vehicle or the like, may be adopted as tasks performed by the application module 100.

Figure 3:
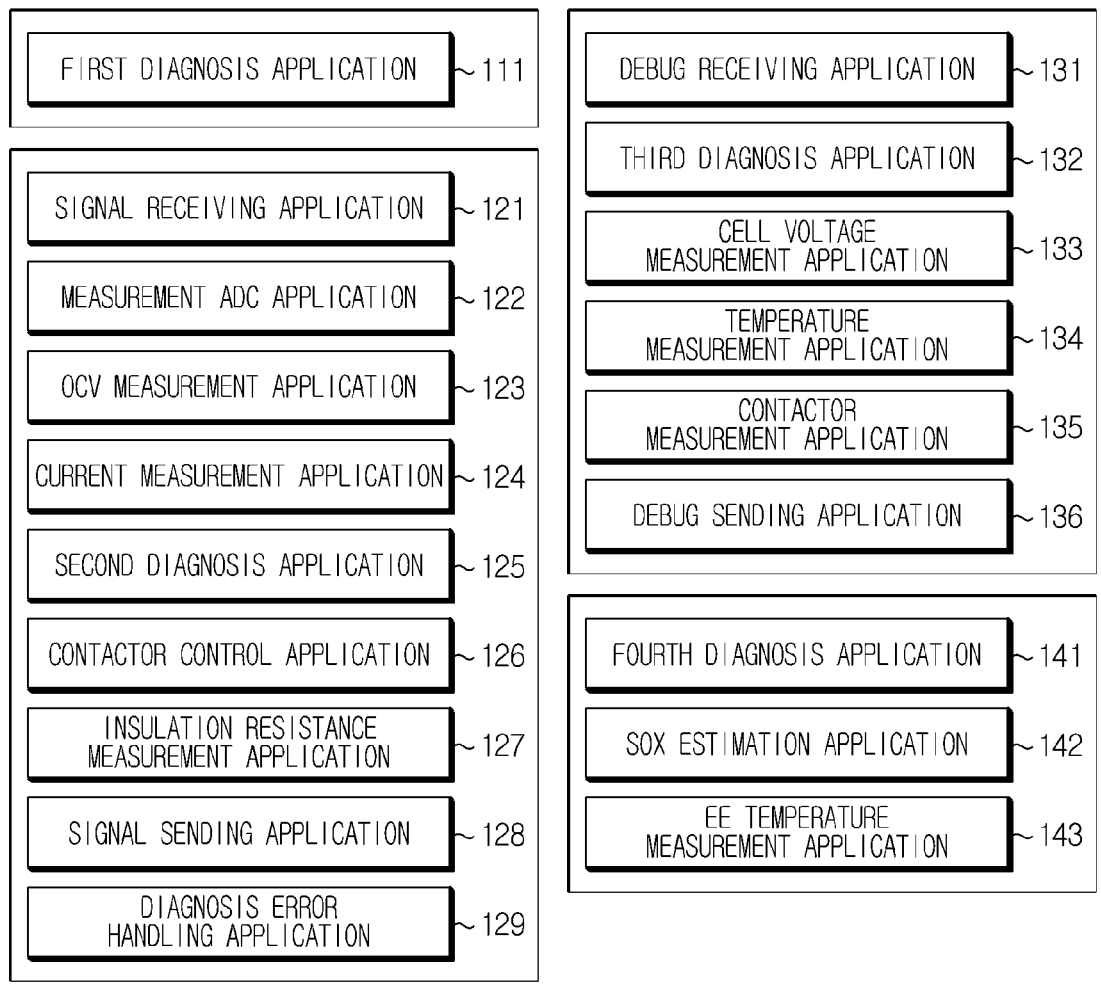
FIG. 3 is a block diagram schematically showing a unit application module, included in an application module according to an embodiment of the present disclosure.

FIG. 3 is a block diagram schematically showing a unit application module, included in an application module 100 according to an embodiment of the present disclosure.

Referring to FIG. 3, as the unit application modules, the application module 100 may include a first diagnosis application 111, a signal receiving application 121, a measurement ADC application 122, an OCV measurement application 123, a current measurement application 124, a second diagnosis application 125, a contactor control application 126, an insulation resistance measurement application 127, a signal sending application 128, a diagnosis error handling application 129, a debug receiving application 131, a third diagnosis application 132, a cell voltage measurement application 133, a temperature measurement application 134, a contactor measurement application 135, a debug sending application 136, a fourth diagnosis application 141, an SOX estimation application 142 and/or an EE temperature measurement application 143.

Here, the first diagnosis application 111 may perform a task of checking whether the battery management apparatus 1000 according to the present disclosure, for example the BMS, wakes up and initializing the diagnosis of the battery management apparatus 1000. The signal receiving application 121 may perform a task of periodically receiving a CAN signal, which is listed up in advance, from the vehicle. The measurement ADC application 122 may perform a task of converting various analog values measured by the battery management apparatus 1000, for example a voltage value, to digital values. The OCV measurement application 123 may perform a task of measuring an open circuit voltage of the battery. For example, the OCV measurement application 123 may perform a task of measuring a voltage of the battery pack in an idle state before the vehicle starts.

The current measurement application 124 may perform a task of measuring a charge or discharge current of the battery. The second diagnosis application 125 may perform a task of diagnosing whether the contactor 3000 is operating properly. As shown in FIG. 2, the contactor 3000 may be located on a path for supplying power from the battery 2000 to the motor 5000 to serve as a switch for controlling the inverter 4000.

The contactor control application 126 may perform a task of controlling the contactor 3000 to turn on and off. The insulation resistance measurement application 127 may perform a task of checking whether an insulation resistor provided at the battery (or, the battery pack) is normal or whether an excessive current flows in the insulation resistor. The signal sending application 128 may perform a task of periodically transmitting a CAN signal, which is listed up in advance, to the vehicle. The diagnosis error handling application 129 may perform a task of handling an error identified by various diagnosis applications.

The debug receiving application 131 may perform a task of receiving data for debugging through CAN communication from devices of the vehicle other than the battery management apparatus 1000, for example various electronic control units (ECUs) 6000 of the vehicle. At this time, the data received by the debug receiving application 131 is data that is not required at the vehicle, and may be information mainly used for analysis or debugging.

The third diagnosis application 132 may perform a task of diagnosing overvoltage, overcurrent or the like of each cell provided in the battery. The cell voltage measurement application 133 may perform a task of measuring a voltage of each cell provided in the battery. The temperature measurement application 134 may perform a task of measuring a temperature of inner and outer portions of the battery 2000 and/or the battery management apparatus 1000. The contactor measurement application 135 may measure a state of the contactor 3000. In particular, the contactor 3000 may include a connection terminal and a coil unit that serves to open and close the connection terminal, and whether the connection terminal is opened or closed may be determined depending on whether power is applied to the coil unit. At this time, the contactor measurement application 135 may measure voltages at both ends of the coil of the contactor. The debug sending application 136 may perform a task of sending a command to send various information for analysis or debugging to peripheral devices through CAN communication so that the debug receiving application 131 may receive the information from devices other than the battery management apparatus, for example the ECU 6000.

The fourth diagnosis application 141 may perform a task of diagnosing whether an ambient temperature is a very high temperature above a certain level and/or a very low temperature below a certain level. The SOX estimation application 142 may perform a task of estimating various states of the battery 2000, for example a state of charge (SOC) and/or a state of health (SOH). The EE temperature measurement application 143 may perform a task of measuring a temperature of an electric-electronic (EE) device surrounding the battery.

The application module 100 may include a variety of other unit application modules, in addition to the above application, and perform a variety of other tasks. In particular, the application module 100 may be configured to perform various tasks of a BMS for a vehicle, well known at the time of the filing of this application.

The application module 100 may perform each task at a predetermined cycle. That is, each unit application module included in the application module 100 may perform the corresponding task at a predetermined cycle. At this time, the performance cycle of the task may be predetermined and stored in the memory module 400 or the like, or may be allocated by a task scheduler or the like, which is a component separate from each unit application module.

For example, seeing FIG. 3, the first diagnosis application may be configured to perform a task with a cycle of 1 ms. In addition, the signal receiving application, the measurement ADC application, the OCV measurement application, the current measurement application, the second diagnosis application, the contactor control application, the insulation resistance measurement application, the signal sending application and the diagnosis error handling application may be configured to perform tasks with a cycle of 10 ms. Also, the debug receiving application, the third diagnosis application, the cell voltage measurement application, the temperature measurement application, the contactor measurement application and the debug sending application may be configured to perform each task with a cycle of 100 ms. In addition, the fourth diagnosis application, the SOX estimation application and the EE temperature measurement application may be configured to perform each task with a cycle of 1000 ms.

In particular, in the battery management apparatus according to the present disclosure, the application module 100 may be configured to perform only one task by a single unit application module at a specific time point. That is, only one task may be performed by the application module 100 at a specific time point. This is to prevent a problem that at least some tasks are not performed properly since two or more tasks are performed simultaneously.

The emergency recognition module 200 may recognize an emergency situation of the vehicle equipped at which a battery and the battery management apparatus according to the present disclosure are loaded. Here, the emergency situation may mean a state where the vehicle is not in a normal state but in an abnormal state. The emergency situation may include various abnormal situations. For example, the emergency situation may mean a situation where an impact is applied to the vehicle.

Preferably, the emergency recognition module 200 may include a brake pressure measuring sensor. In addition, the brake pressure measuring sensor may measure a brake pressure. For example, the brake pressure measuring sensor may measure the brake pressure by recognizing the degree or angle of a brake pedal stepped by a driver.

Figure 4:
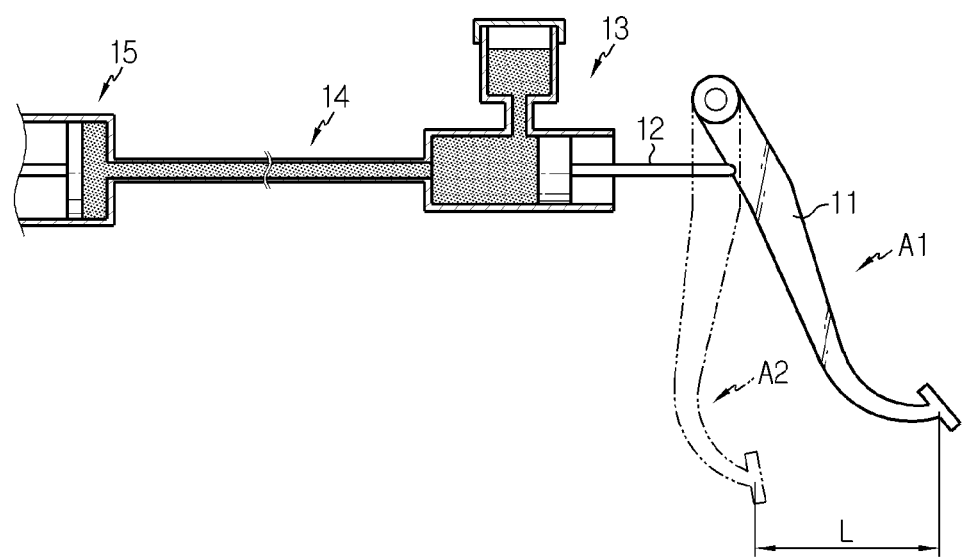
FIG. 4 is a diagram schematically showing an example of a partial configuration of a brake system of the vehicle.

FIG. 4 is a diagram schematically showing an example of a partial configuration of a brake system of the vehicle.

Referring to FIG. 4, a brake system of the vehicle may include a brake pedal 11, a push rod 12, a master cylinder 13, a brake hose 14, a wheel cylinder 15, and the like. In addition, one side (a fixed point) of the brake pedal 11 is located at a position A1 in a fixed state, and when a driver steps the other side (an action point) of the brake pedal 11, the brake pedal 11 may be moved to a position A2. In this case, the force applied to the push rod 12 near the fixed point may generate a hydraulic pressure by pushing a piston of the master cylinder 13. In addition, the hydraulic pressure of the master cylinder may be transmitted to the wheel cylinder 15 provided at a wheel of the vehicle via the brake hose 14.

In this configuration, the brake pressure measuring sensor may obtain the brake pressure by measuring a depressed distance of the brake pedal 11. For example, in the configuration of FIG. 4, the pressure applied to the brake may be obtained by measuring a moving distance of a specific point of the brake pedal 11, as indicated by L.

Alternatively, the brake pressure measuring sensor may obtain the brake pressure by measuring an angle at which the brake pedal is depressed. For example, the brake pressure measuring sensor may obtain the pressure applied to the brake by measuring an angle change of a line connecting the fixed point and the action point.

In addition, the brake pressure measuring sensor may obtain the brake pressure by measuring a hydraulic pressure of the master cylinder or the wheel cylinder of the vehicle brake. Alternatively, the brake pressure measuring sensor may measure the pressure of the brake in a variety of other ways.

Also preferably, the emergency recognition module 200 may include an impact detecting sensor. Here, the impact detecting sensor may detect an impact applied to the vehicle. That is, the impact detecting sensor may measure whether or not an impact has been actually applied to the vehicle. For example, the impact detecting sensor may detect an impact applied to the vehicle by using an impact sensor mounted to a vehicle body to drive an airbag or the like. Alternatively, the impact detecting sensor may be implemented using an acceleration sensor, a gyro sensor, or the like.

When an emergency situation of the vehicle is recognized by the emergency recognition module 200, the cycle changing module 300 may receive information from the emergency recognition module 200 that the emergency situation is recognized. In addition, in this case, the cycle changing module 300 may change a task performance cycle for at least one unit application module in the application module 100. For example, the cycle changing module 300 may be configured to change a cycle of a specific task when an impact is applied to the vehicle.

That is, when the emergency situation of the vehicle is recognized by the emergency recognition module 200, the cycle changing module 300 may change the cycle of the task of the at least one unit application module, among the unit application modules provided in the application module 100.

In particular, the cycle changing module 300 may reduce the cycle of at least one unit application module task, among the unit application modules included in the application module 100, when the emergency situation of the vehicle is recognized. In this case, it is possible to analyze and control the cause and situation more precisely and minutely.

Preferably, if an emergency situation of the vehicle is recognized, the cycle changing module 300 may change the task performance cycle of the cell voltage measurement application. In particular, when an emergency situation occurs in the vehicle, the cycle changing module 300 may reduce the task performance cycle of the cell voltage measurement application.

For example, the cell voltage measurement application may measure a voltage of each battery cell at every 100 ms under normal circumstances. However, if an emergency situation such as a vehicle impact occurs, the cycle changing module 300 may change the task performance cycle of the cell voltage measurement application so that the cell voltage measurement application measures the voltage of each cell at every 1 ms.

According to this configuration of the present disclosure, it is possible to more quickly and accurately figure out the damage of the cell or the possibility of leakage due to an impact by checking the voltage change of each cell more precisely in an emergency situation such as a vehicle impact.

In addition, this may be used for proper follow-up procedures such as cell damage warning, damaged cell location notification, damaged cell detouring path reservation, cell balancing, and the like. Moreover, the information precisely checked may be stored in the memory module 400 to be used later as data for analyzing the cause and status and for managing and maintaining the battery.

In addition, if an emergency situation of the vehicle is recognized, the cycle changing module 300 may change the task performance cycle of the current measurement application. In particular, when an emergency situation occurs in the vehicle, the cycle changing module 300 may reduce the task performance cycle of the current measurement application.

For example, the current measurement application may measure a current flowing in the battery at every 10 ms under normal circumstances. However, if an impact condition occurs at the vehicle, the cycle changing module 300 may change the task performance cycle of the current measurement application so that the current measurement application measures the battery current at every 1 ms.

According to this configuration of the present disclosure, in an emergency situation such as a vehicle impact, it is possible to take appropriate follow-up measures quickly and appropriately, for example to figure out whether or not it is needed to interrupt the current due to an overcurrent situation, by checking the current flowing in the battery precisely. Moreover, the current change history of the battery figured out as above may be stored in the memory module 400 to be used as data for analyzing the cause of an accident, analyzing a battery state, checking an accident history, and the like.

In addition, if an emergency situation of the vehicle is recognized, the cycle changing module 300 may change the task performance cycle of the temperature measurement application. In particular, when an emergency situation occurs in the vehicle, the cycle changing module 300 may reduce the task performance cycle of the temperature measurement application.

For example, the temperature measurement application may measure a temperature of the battery at every 100 ms under normal circumstances. However, if an impact condition occurs at the vehicle, the cycle changing module 300 may change the task performance cycle of the temperature measurement application so that the temperature measurement application measures the temperature of the battery at every 1 ms.

According to this configuration of the present disclosure, in an emergency situation such as a vehicle impact, it is possible to quickly and accurately detect and handle an excessive temperature rise or ignition of the battery due to impact by checking the temperature change of the battery more precisely. In addition, the temperature change history of the battery figured out as above is stored in the memory module 400 to be used as data for helping to manage or maintain the battery in the future.

Also, if an emergency situation of the vehicle is recognized, the cycle changing module 300 may change the task performance cycle of the contactor measurement application. In particular, when an emergency situation occurs in the vehicle, the cycle changing module 300 may reduce the task performance cycle of the contactor measurement application.

For example, the contactor measurement application may measure a coil voltage of the contactor at every 100 ms under normal circumstances. However, if an impact condition occurs at the vehicle, the cycle changing module 300 may change the task performance cycle of the contactor measurement application to 1 ms so that the contactor measurement application may measure the coil voltage of the contactor at every 1 ms.

According to this embodiment of the present disclosure, it is possible to more quickly and accurately figure out whether there is an abnormality in the control status of the contactor with respect to the motor in an emergency situation such as a vehicle impact. In addition, the coil voltage change history of the contactor figured out as above may be stored in the memory module 400 to be used as data for helping to check and manage the state of the battery in the future.

In addition, when the emergency recognition module 200 recognizes an emergency situation of the vehicle, the cycle changing module 300 may change the task performance cycle of the debug receiving application. In particular, when an emergency situation occurs in the vehicle, the cycle changing module 300 may reduce the task performance cycle of the debug receiving application.

For example, the debug receiving application may receive debugging data from other devices of the vehicle, such as an ECU, via CAN communication at every 100 ms under normal circumstances. However, if an impact condition occurs at the vehicle, the cycle changing module 300 may change the task performance cycle of the debug receiving application so that the debug receiving application may receive debugging data at every 10 ms.

Meanwhile, in this case, the debug sending application for executing a command to transmit the debugging data may also perform a task at every 100 ms under normal circumstances, and if the emergency situation of the vehicle is recognized, the cycle changing module 300 may perform a task at every 10 ms.

According to this configuration of the present disclosure, in the event of an emergency situation such as a vehicle impact, it is possible to quickly take appropriate measures for the corresponding device by more rapidly collecting data from the ECU or the EE of the vehicle. In addition, the data obtained from the vehicle as described above may be stored in the memory module 400 of the battery management apparatus to be utilized as data for helping to manage and maintain the battery in the future.

In addition, the data obtained more quickly and finely as the performance cycles of various tasks are reduced as described above may also be utilized for controlling to minimize damage such as burning of peripheral devices or fire. In addition, the data may be used for collecting data in a case study form by recording BMS control and communication data change with peripheral devices in an emergency as much as possible. Moreover, the collected data may be used as important data in an algorithm for predicting SOC, SOH, output or the like of the battery.

The cycle changing module 300 may determine whether the brake pressure measured by the brake pressure measuring sensor is a reference value or above. In addition, if the measured value is the reference value or above, the cycle changing module 300 may change a task performance cycle of a specific unit application module.

In particular, the emergency recognition module 200 may recognize an emergency situation of the vehicle by using the moving distance of the brake pedal. For example, in the configuration of FIG. 4, the brake pressure measuring sensor provided at the emergency recognition module 200 may measure the moving distance L of a specific point of the brake pedal as the brake pressure. In addition, the reference distance to be compared with the moving distance L may be stored as a reference value in advance in the memory module 400 of the battery management apparatus. In this case, the emergency recognition module 200 may determine whether the vehicle is in an emergency situation by comparing the moving distance L of the brake pedal measured by the brake pressure measuring sensor with the predetermined reference distance.

For example, when the reference distance is 10 cm as the reference value, if the measured moving distance of the brake pedal is 7 cm, it is less than the reference distance, and thus the emergency recognition module 200 may determine that the current vehicle situation is a normal situation. Meanwhile, if the measured moving distance of the brake pedal is 12 cm, it exceeds the reference distance (10 cm), and thus the emergency recognition module 200 may determine that the current vehicle situation is an emergency situation. In addition, the emergency recognition module 200 may transmit information about the emergency situation to the cycle changing module 300.

If so, the cycle changing module 300 may change a task performance cycle of a specific unit application module. For example, the cycle changing module 300 may shorten the task performance cycles of some unit application modules, for example the cell voltage measurement application, the temperature measurement application and/or the contactor measurement application, from 100 ms to 1 ms. In addition, the cycle changing module 300 may shorten the task performance cycles of the debug receiving application and the debug sending application from 100 ms to 10 ms.

As another example, the emergency recognition module 200 may recognize an emergency situation of the vehicle by comparing a rotation angle of the brake pedal with a reference angle. In this case, if the rotation angle of the brake pedal is the reference angle (for example, 30°) or above, the brake pressure measured by the brake pressure measuring sensor may be determined to be equal to or greater than the reference value. That is, the emergency recognition module 200 may recognize that the vehicle is in an emergency situation if the rotation angle of the brake pedal is equal to or greater than the predetermined reference angle.

As another example, the emergency recognition module 200 may recognize an emergency situation of the vehicle by comparing a hydraulic pressure of the master cylinder or a hydraulic pressure of the wheel cylinder with a predetermined reference hydraulic pressure.

In such various configurations, the reference angle or the reference hydraulic pressure, which is compared with the measured angle or the measured hydraulic pressure, may be stored in the memory module 400 in advance by a manufacturer or a manager.

In addition, if the emergency recognition module 200 recognizes an emergency situation of the vehicle, the cycle changing module 300 may change the task performance cycles of at least some unit application modules included in the application module 100, as described above.

As described above, according to the configuration in which an emergency situation of the vehicle is recognized using the brake pressure measured by the brake pressure measuring sensor and the task performance cycle is changed, it is possible to collect data faster and in more detail and appropriately cope with the situation. In particular, in many traffic accidents, a driver often tries to brake the vehicle by recognizing that the accident is likely to occur before an actual impact. In this case, the performance cycles of several tasks may become faster or slower before the actual impact occurs. In addition, the performance cycles of the tasks may be changed in an appropriate way in preparation for an accident situation. For example, by shortening the task performance cycle of the cell voltage measurement application before an actual real impact event occurs, the cell voltage change before and after the accident may be measured more precisely. Thus, it is possible to more accurately figure out whether or not the cell voltage is changed due to the accident.

In addition, the precise measured values may be stored in the memory module 400 and used later for easily analyzing the cause and content of the failure and easily managing or repairing the battery. Further, according to an embodiment of the present disclosure, various information may be measured and stored more precisely just before an accident, rather than always being stored finely. Thus, even though the memory module 400 has a small capacity, it is possible to implement the present disclosure. In particular, a BMS or the like currently employed at an electric vehicle or a hybrid electric vehicle does not have a large memory capacity, and thus it is difficult to always store a large amount of information. However, in the above configuration, the information may be finely stored only in a specific situation where the brake pressure is equal to or greater than the reference value, and thus the present disclosure may be easily implemented just with a small memory capacity.

In addition, the precise measured values may be used for controlling the current by interrupting the current at all cells first to prevent an electric shock or a current leakage at the time of an accident. Alternatively, the precise measured values may be used to reduce damage caused by a high voltage by blocking the connection of some cells to lower the battery voltage. As described above, the data measured precisely before the occurrence of an accident may be used for preparing accidental operations of various control devices provided at the vehicle.

Moreover, according to an embodiment of the present disclosure, the task performance cycle may be changed even when the impact sensor or the like does not operate properly in an accident situation. It is a constant problem that an airbag is not deployed in some traffic accident situations, which is often caused by the imperfection of the impact sensor or the like. However, according to the present disclosure in which the task performance cycle is changed according to the measured brake pressure, the task performance cycle may be changed quickly and accurately even though the impact sensor does not operate.

In addition, according to the configuration of the present disclosure, even though no actual accident occurs, various information about an accident risk situation may be stored. For example, even though an impact accident does not occur, when quick braking is performed, the information about the state of the battery or other device of the vehicle, such as the ECU, may be measured more precisely at the accident risk situation and stored. The measurement information may be used later as information useful for manufacturing, maintaining or managing a battery management apparatus, a battery, or and other devices of other vehicles.

Also preferably, the emergency recognition module 200 may recognize an emergency situation of the vehicle using the pressure change of the brake per unit time.

For example, the emergency recognition module 200 may recognize an emergency situation of the vehicle by comparing a moving distance L of the brake pedal per unit time, namely a speed at which the brake pedal is depressed, with a reference speed (or, a reference value). For example, assuming that the reference speed is 3 cm/s, if the measured distance of the brake pedal is 2 cm per second, this may be considered as normal braking and be recognized as a normal situation, not an emergency situation of the vehicle. However, if the measured distance of the brake pedal is 5 cm per second, this may be considered as sudden braking and be recognized as an emergency situation of the vehicle, and then the emergency recognition module 200 may transmit a signal to the cycle changing module 300 to notify that the vehicle is in an emergency situation. Then, the cycle changing module 300 may change the performance cycle for a task of a specific unit application module.

According to the configuration of the present disclosure, the task performance cycle may be not changed for all situations where the vehicle is being halted by the brake but be changed only in a situation where the vehicle is suddenly stopped. Thus, since the task performance cycle is changed only in a situation where the probability of actual accident is high, it is possible to reduce the overload of the cycle changing module 300 and the application module 100 and reduce the load or capacity of the memory module 400. In particular, if the battery is suddenly braked, a more burden may be applied to the battery or the vehicle. Thus, various state information before and after the sudden braking operation may be more precisely measured.

As another example, the cycle changing module 300 may be configured to be turned on when the brake pressure measured by the brake pressure measuring sensor is equal to or greater than a reference value. The cycle changing module 300 may be configured to change the task performance cycle when an impact is detected by the impact detecting sensor.

That is, in the former embodiments, it is illustrated that the task performance cycle is changed by the cycle changing module 300 when the brake pressure is equal to or greater than the reference value. However, even though the brake pressure is higher than the reference value, the task performance cycle may not be changed immediately. However, in this embodiment, if the brake pressure measured by the brake pressure measuring sensor is equal to or greater than the reference value, the cycle changing module 300 may be turned on wait in a standby state. In addition, if it is detected by the impact detecting sensor that an actual impact or a similar situation has occurred, the cycle changing module 300 may change the task performance cycle for at least some unit application modules.

According to the configuration of the present disclosure, since the task performance cycle is changed only when an actual impact is measured by the impact detecting sensor, it is possible to reduce the load applied to the cycle changing module 300 and the application module 100. In addition, in this case, the storage capacity to be stored in the memory module 400 may be reduced. Moreover, since the cycle changing module 300 is already turned on and in a standby state before the actual impact is detected by the impact detecting sensor, the task performance cycle may be changed quickly as soon as an impact is detected by the impact detecting sensor.

As another example, the cycle changing module 300 may be configured such that the task performance cycle for the same unit application module is changed two or more times differently. At this time, the emergency recognition module 200 may classify two or more types of emergency situations of the vehicle and transmit them to the cycle changing module 300.

More specifically, if the brake pressure measured by the brake pressure measuring sensor is equal to or greater than the reference value, the cycle changing module 300 may primarily change the task performance cycle of at least one unit application module task. In addition, if an impact of the vehicle is detected by the impact detecting sensor, the cycle changing module 300 may secondarily change the primarily changed task performance cycle again. In particular, the secondarily changed task performance cycle may be configured to be shorter than the primarily changed task performance cycle.

For example, if the moving distance of the brake measured by the brake pressure measuring sensor is greater than the reference distance, the emergency recognition module 200 may recognize that this is a primary emergency situation of the vehicle and transmit the corresponding information to the cycle changing module 300. If so, the cycle changing module 300 may change the task performance cycle of at least one unit application module, for example the current measurement application, from 100 ms to 10 ms (primary change).

In addition, after that, if an impact of the vehicle is detected by the impact detecting sensor, the emergency recognition module 200 may recognize that this is a secondary emergency situation of the vehicle and transmit the corresponding information to the cycle changing module 300. If so, the cycle changing module 300 may change the task performance cycle of the current measurement application from 10 ms to 1 ms (secondary change).

According to the configuration of the present disclosure, various countermeasure tasks and information are stored finely and rapidly from a danger moment before an accident occurs at the vehicle, and the task performance cycle of the vehicle is differently set before and after the accident or according to the degree of approximation to the accident, so as to prevent an excessive load on the cycle changing module 300 and the application module 100 and reduce the amount of information stored in the memory module 400.

In addition, the cycle changing module 300 may differentially change the task performance cycle into a plurality of performance cycles according to the brake pressure measured by the brake pressure measuring sensor. At this time, the reference value by the brake pressure may be set in plural. For example, the pressure reference value that is compared with the measured brake pressure may include two reference values, namely a first reference value and a second reference value. Even in this case, the emergency recognition module 200 may recognize an emergency situation as a plurality of different types. For example, the emergency recognition module 200 may distinguish and recognize two types of emergency situations.

For example, if the brake pressure is measured using the moving distance of the brake pedal by the brake pressure measuring sensor, the first reference value may be preset to 5 cm and the second reference value may be preset to 10 cm. At this time, when the moving distance of the brake pedal is measured as 5 cm, the emergency recognition module 200 may periodically transmit the information of the primary emergency situation of the vehicle to the cycle change module. If so, the cycle changing module 300 may primarily change the task performance cycle for at least one unit application module.

In addition, after that, when the moving distance of the brake pedal is measured as 10 cm, the emergency recognition module 200 may transmit the information of the secondary emergency situation of the vehicle to the cycle change module. In addition, the cycle changing module 300 may secondarily change the task performance cycle for at least one unit application module. At this time, the secondarily changed task performance cycle may have a different value from the primarily changed task performance cycle and may be set to be shorter than the primarily changed task performance cycle.

According to this configuration of the present disclosure, as the task performance cycle is set differently according to the degree of brake depression, it is possible to perform various tasks for coping with the accident more quickly from the moment of the accident, store more relevant information, perform most tasks at the time nearest to the accident before the accident, and store the most detailed information. In this case, it may be possible to perform tasks and store information more efficiently.

The battery management apparatus according to the present disclosure may further include the memory module 400, as described above several times.

The memory module 400 may store various information related to the battery. Further, the memory module 400 may store various information required for operating the battery management apparatus according to the present disclosure and/or various information obtained by operating the battery management apparatus. For example, the memory module 400 may store data about at least one of voltage, current and temperature of the battery.

Also, the memory module 400 may possess data about the reference value, such as the reference distance, the reference angle, the reference speed or the like, needed for the emergency recognition module 200 to recognize the emergency situation of the vehicle.

In addition, the memory module 400 may store a task performance cycle of each unit application module, particularly a task performance cycle in a normal state, as well as a task performance cycle changed by the cycle changing module 300 in an emergency situation. If so, each unit application module of the application module 100 may perform each task according to the task performance cycle stored in the memory module 400 as described above.

The memory module 400 may include a non-volatile memory. In this case, the data about at least one of the current, voltage and temperature of the battery may be stored in the non-volatile memory. The memory module 400 may store the data about the current, voltage and/or temperature of the battery in the non-volatile memory when the battery management apparatus is turned on and off.

In addition, the memory module 400 of the battery management apparatus according to the present disclosure may be configured to record at least some data whenever a pressure is applied to the brake of the vehicle. In particular, the memory module 400 may record the data about at least one of voltage, current and temperature of the battery whenever a pressure is applied to the brake of the vehicle. In this case, the memory module 400 may record the data about the voltage, current and temperature of the battery in the non-volatile memory. In addition, the memory module 400 may store the recorded data when the brake pressure of the vehicle is equal to or greater than the reference pressure.

In particular, the memory module 400 may record the information about the voltage, current and/or temperature of the battery in the non-volatile memory as soon as the brake is depressed by the driver. If the brake pressure is equal or greater than the reference value, the data recorded as above may be stored in the non-volatile memory. Meanwhile, if the brake pressure is smaller than the reference value, the data recorded in the non-volatile memory may not be stored. For example, if the brake pressure does not reach the reference pressure within a certain time from the point when the brake starts to be stepped on, the memory module 400 may not store the recorded data. At this time, the memory module 400 may delete the data recorded but not stored or may overwrite other data thereon.

According to this configuration of the present disclosure, the information about the voltage, current and/or temperature of the battery in an emergency situation where the brake is stepped on may be stored in the non-volatile memory. Thus, by using this information, it is easy to manage and maintain the battery later. Further, according to this configuration of the present disclosure, the information of the voltage, current and/or temperature of the battery may be recorded for all cases where the brake is stepped on, but the information is stored in the non-volatile memory only when the brake pressure is higher than a predetermined pressure. In this case, the present disclosure may be easily applied even when the storage capacity of the non-volatile memory is small. In particular, a non-volatile memory of a BMS or the like, which is commercially available, mostly has a small capacity. However, according to this configuration of the present disclosure, a large capacity may not be required compared with the non-volatile memory of an existing BMS.

In addition, the memory module 400 may include a volatile memory. In particular, the task performing result of each unit application module performed at predetermined intervals may be stored in the volatile memory of the memory module 400.

Also preferably, when the vehicle is stopped, the cycle changing module 300 may restore the changed task cycle to its original state. In particular, the cycle changing module 300 may restore the task performance cycle after a predetermined time since the vehicle is stopped. For example, the cycle changing module 300 may restore the task performance cycle to its original state 10 seconds after the vehicle is stopped.

For example, if the brake pressure exceeds the reference value and thus the task performance cycles for the cell voltage measurement application, the temperature measurement application and the contactor measurement application are changed from 100 ms to 1 ms, the cycle changing module 300 may roll back the changed task performance cycles to 100 ms when the vehicle is stopped.

According to this configuration of the present disclosure, since the information near the time when the accident occurs is collected and stored in detail, the task performance cycle is restored after the time when the accident occurs or after a predetermined time since the accident occurs, so that the load applied to the application module 100 or the memory module 400 may be reduced.

Meanwhile, whether the vehicle is stopped, which is a criterion for the cycle changing module 300 to restore the task performance cycle, may be detected by using various devices provided at the vehicle, for example a speedometer device of the vehicle. In this case, when the vehicle speed is zero, the speedometer device of the vehicle may transmit vehicle stop information to the cycle changing module 300.

Alternatively, the cycle changing module 300 may restore the task performance cycle to its original state when the vehicle engine is turned off.

Also preferably, the cycle changing module 300 may monitor the load of the battery management apparatus according to the present disclosure. The cycle changing module 300 may reflect the monitoring result to increase the task performance cycle (interval) for some unit application modules of the application module 100.

That is, the cycle changing module 300 may monitor the load on at least one of the application module 100, the emergency recognition module 200, the cycle changing module 300 and the memory module 400. If it is determined that one or more of the modules are overloaded, the task performance cycle for some unit application modules may be elongated.

For example, if at least a part of the battery management apparatus according to the present disclosure is performed by a single microcontroller unit (MCU), the cycle changing module 300 searches a process usage of these microcontroller units, and then, if the process usage exceeds a reference usage, the cycle changing module 300 may increase the task performance cycle of a predetermined unit application module. Alternatively, the cycle changing module 300 may search a storage capacity (occupancy) of the memory module 400 included in the battery management apparatus and may increase the task performance cycle of a certain unit application module when the storage capacity exceeds a reference capacity.

As a more detailed example, if an emergency situation of the vehicle is recognized and the cycle changing module 300 shortens the task performance cycles for the current measurement application, the temperature measurement application and the cell voltage measurement application, the load of the application module 100 and the memory module 400 may increase. At this time, if the load of the application module 100 and the memory module 400 exceeds the reference load, the cycle changing module 300 may increase the task performance cycle of some of the other unit application modules, for example the signal receiving application, from 10 ms to 100 ms.

According to this configuration of the present disclosure, it is possible that the battery management apparatus performs easy and proper load balancing. In other words, in an emergency situation such as a vehicle accident, tasks having more interrelation to the emergency situation may be performed more precisely and tasks having less interrelation to the emergency situation may be performed less, and thus it is possible to prevent the entire battery management apparatus, or some components thereof, from being overloaded.

Meanwhile, in the battery management apparatus according to an embodiment of the present disclosure, the emergency recognition module 200 may sense a position of an impact applied to the vehicle. For example, the emergency recognition module 200 may include impact detecting sensors at various portions of the vehicle body to determine the location of impact applied to the vehicle. In this case, the cycle changing module 300 may change task performance cycles for two or more unit application modules that perform the same type of task at different positions.

For example, the temperature measurement application of the application module 100 may include a first temperature measurement application for performing a task to measure a temperature of a left side of the battery and a second temperature measurement application for measuring a temperature of a right side of the battery. In this case, if the emergency recognition module 200 recognizes that an impact is applied to the vehicle at the left side of the battery, the cycle changing module 300 may change the task performance cycle for the first temperature measurement application shorter than the task performance cycle for the second temperature measurement application.

According to this configuration of the present disclosure, the temperature may be measured relatively precisely at a location close to a portion where the impact occurs. Thus, it is possible to detect the fire or the like more quickly and take appropriate measures by measuring the temperature more precisely and more precisely with respect to the portion where damage is likely to occur relatively easily.

As another example, the cell voltage measurement application of the application module 100 may include a first cell voltage measurement application for measuring voltages of cells located at the left side of the battery and a second cell voltage measurement application for measuring voltages of cells located at the right side of the battery. If the emergency recognition module 200 recognizes that an impact is applied to the vehicle at the left side of the battery, the cycle changing module 300 may change the task performance cycle for the first cell voltage measurement application shorter than the task performance cycle for the second cell voltage measurement application.

In this case, since the voltages of the cells located close to a portion where the impact is applied are measured more precisely and quickly, it is possible to more quickly and accurately figure out the damage of the cells or the electric disconnection between the cells, caused by the impact, at the corresponding portion.

Meanwhile, when a single unit application module performs two or more tasks at different positions in the same form, the cycle changing module 300 may change the task performance changes for two or more tasks of the corresponding unit application module so that the task performance cycle differs depending on positions.

The battery management apparatus according to the present disclosure is a device that manages a battery (or, a battery pack) included in the vehicle. In particular, in the present disclosure, the vehicle may be a vehicle using a battery as its driving source, such as an electric vehicle or a hybrid electric vehicle.

Conventionally, an electric vehicle or the like may include a BMS as a device for managing the battery. At least some components of the battery management apparatus according to the present disclosure may be implemented using the BMS. That is, in the battery management apparatus according to the present disclosure, the application module 100, the emergency recognition module 200, the cycle changing module 300 and/or the memory module 400 may be implemented by the BMS. Alternatively, at least a portion of the emergency recognition module 200, for example the brake pressure measuring sensor or the impact detecting sensor, may be provided out of the BMS at the vehicle.

The battery management apparatus according to the present disclosure may be included in the battery pack (or, the battery). In this case, the battery pack according to the present disclosure may be regarded as including the battery management apparatus according to the present disclosure. Also, in addition to the battery management apparatus, the battery pack according to the present disclosure may further include various electric components such as battery cells (or, secondary batteries), cell cartridges for stacking the battery cells, bus bars, fuses and relays, as well as a pack case for accommodating these internal components.

The battery management apparatus according to the present disclosure may be applied to a vehicle. Thus, the vehicle according to the present disclosure may include the battery management apparatus according to the present disclosure. Also, in addition to the battery management apparatus, the vehicle according to the present disclosure may further include a vehicle body, electronic components and the like, which are ordinarily provided at the vehicle. For example, as shown in FIG. 2, the vehicle according to the present disclosure may further include a battery, a contactor, an inverter, a motor and at least one ECU. However, the present disclosure is not specifically limited in relation to the components of the vehicle other than the battery management apparatus.

Figure 5:
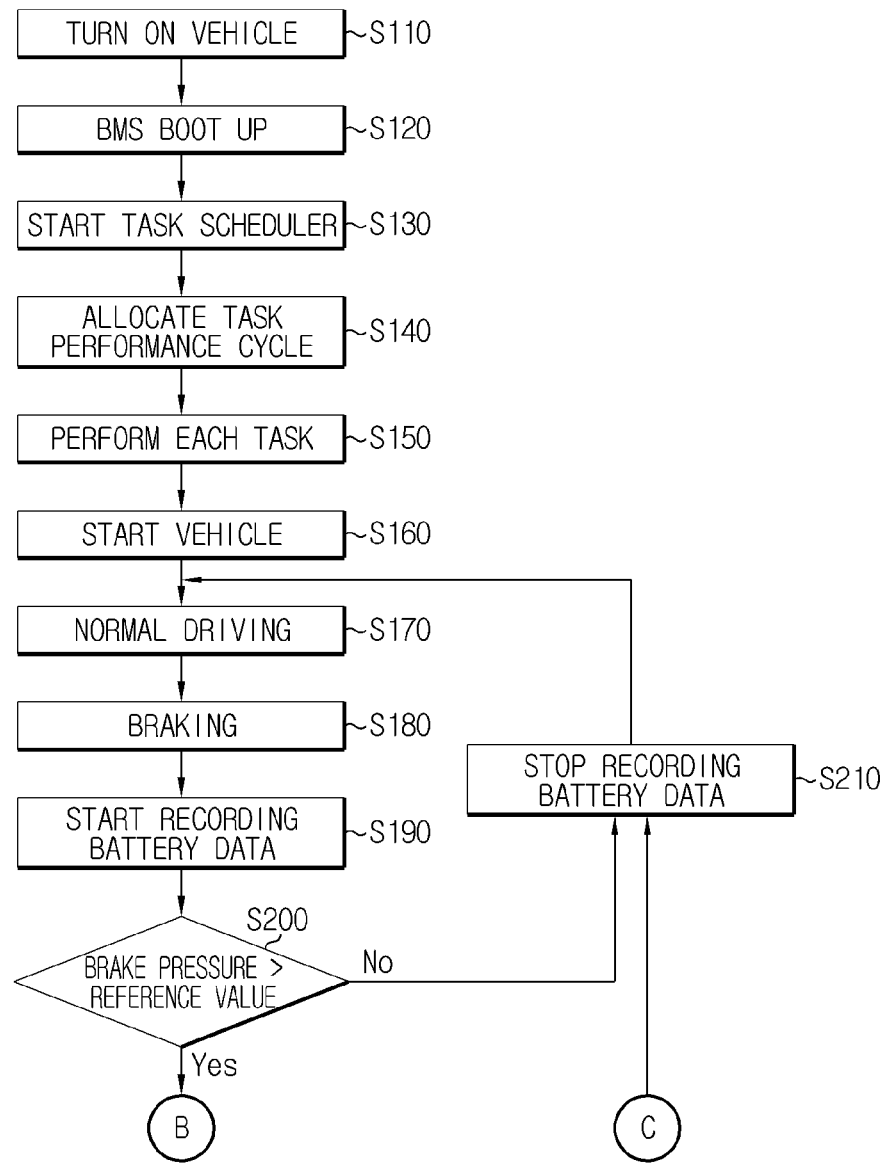
FIGS. 5 and 6 are flowcharts for schematically illustrating a battery management method of the battery management apparatus according to an embodiment of the present disclosure.
Figure 6:
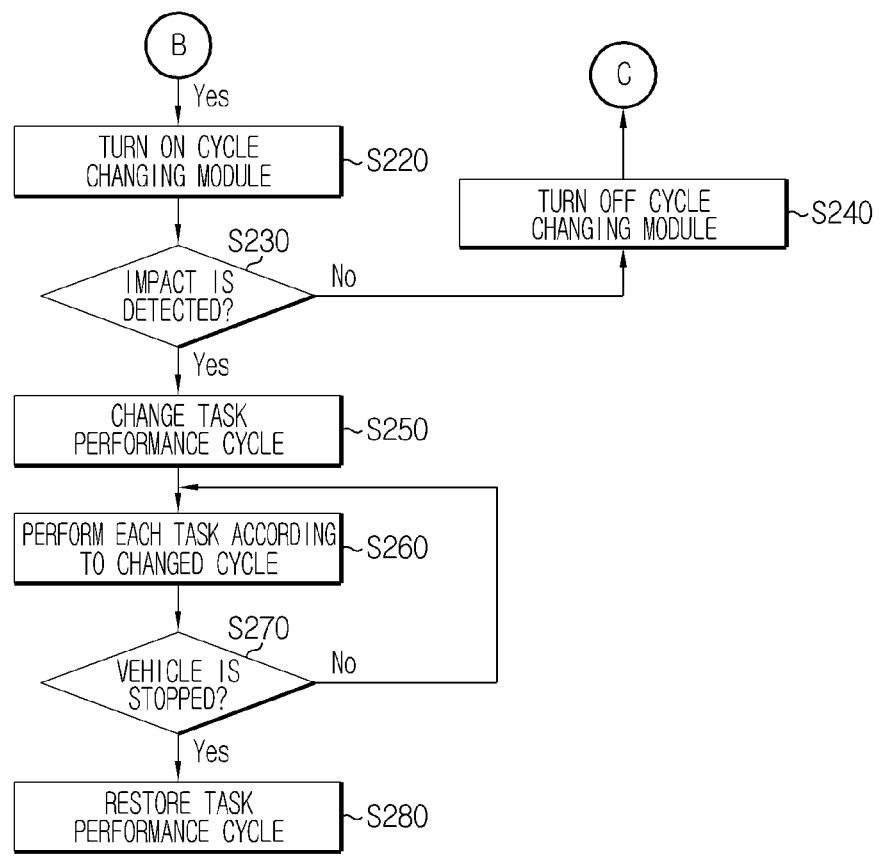

FIGS. 5 and 6 are flowcharts for schematically illustrating a battery management method of the battery management apparatus according to an embodiment of the present disclosure. FIGS. 5 and 6 may form a single flowchart by interconnecting the portions B and C. In FIGS. 5 and 6, a subject that performs at least part of all steps may be regarded as a component included in the battery management apparatus according to the present disclosure.

Referring to FIGS. 5 and 6, as a vehicle is turned on (S110), the BMS including the battery management apparatus according to the present disclosure is booted up (S120). Also, the task scheduler starts (S130), and the task performance cycle of each unit application module included in the application module may be allocated (S140). Here, the task scheduler may be provided in the application module or may be separately provided in addition to the application module.

If the task performance cycle is allocated as described above, the unit application modules provided in the application module perform respective tasks according to the allocated cycle (S150). Next, the vehicle is started (S160), and the vehicle is normally driven (S170). Here, if the driver steps on the brake of the vehicle (S180), data related to the battery such as the voltage, current and temperature of the battery starts being recorded in the non-volatile memory (S190). Also, the brake pressure is compared with the reference value (S200), and then, if the brake pressure is lower than the reference value, recording the battery-related data is terminated (S210). Meanwhile, if the brake pressure is higher than the reference value, the cycle changing module is turned on and comes into a standby state (S220). In addition, it is detected whether an impact is applied to the vehicle (S230), and if an impact is not detected, the cycle changing module is turned off again (S240). However, if an impact applied to the vehicle is detected, the task performance cycle for at least some unit application modules is changed (S250).

If so, each unit application module performs respective task according to the changed performance cycle (S260). After that, it is detected whether the vehicle is stopped (S270), and then, if the vehicle is stopped, the task performance cycle is restored to its original state (S280).

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the term 'module' has been used in the present specification, such as an 'application module', an 'emergency recognition module', a 'cycle changing module', and a 'memory module', it is obvious to those skilled in the art that such a term indicates a logical unit and does not necessarily indicate a component that is physically separable or has to be physically separated.

REFERENCE SIGNS

100: application module
200: emergency recognition module
300: cycle changing module
400: memory module
1000: battery management apparatus
2000: battery
3000: contactor
4000: inverter
5000: motor
6000: ECU

What is claimed is:

1. A battery management apparatus for managing a battery included in a vehicle, the battery management apparatus comprising:
    memory storing instructions for performing one or more tasks, and respective predetermined performance cycles for the one or more tasks;
    a controller configured to:
    perform the one or more tasks at the respective predetermined cycles; and
    for at least one first task, change the performance cycle of the at least one first task in response to at least one of:
    an impact applied to the vehicle detected by an impact detecting sensor; or
    a brake pressure measured by a brake pressure measuring sensor being at or above a reference value.

2. The battery management apparatus according to claim 1,
    further comprising the brake pressure measuring sensor.

3. The battery management apparatus according to claim 2,
    further comprising the impact detecting sensor.

4. The battery management apparatus according to claim 1,
    wherein the controller is configured to:
    initiate a cycle changing program in response to the brake pressure measured by the brake pressure measuring sensor being at or above the reference value; and
    change the performance cycle of the at least one first task in response to the impact detecting sensor detecting an impact applied to the vehicle.

5. The battery management apparatus according to claim 1,
    wherein the controller is configured to:
    when the brake pressure measured by the brake pressure measuring sensor is at or above the reference value, change the performance cycle of the at least one first task from the predetermined performance cycle to a first changed performance cycle; and
    when the impact detecting sensor detects an impact applied to the vehicle, the performance cycle of the at least one first task from the first changed performance cycle to a second changed performance cycle.

6. The battery management apparatus according to claim 1,
    wherein the memory is configured to store information of the battery,
    wherein information data of the battery is recorded to the memory whenever a pressure is applied to a brake of the vehicle, and the memory is configured to store the recorded information data when the brake pressure measured by the brake pressure measuring sensor is at or above the reference value.

7. The battery management apparatus according to claim 1,
    wherein the one or more tasks includes at least one of a cell voltage measurement task of measuring a voltage of each cell included in the battery, a current measurement task of measuring a current flowing in the battery, a temperature measurement task of measuring a temperature of the battery, a contactor measurement task of measuring a voltage of a coil to control a contactor, and a debug receiving task of receiving debugging data from another device of the vehicle through a controller area network (CAN) communication.

8. The battery management apparatus according to claim 7,
    wherein the controller is configured to reduce the performance cycle of the at least one first task in response to the at least one of an impact applied to the vehicle detected by an impact detecting sensor or a brake pressure measured by a brake pressure measuring sensor being at or above a reference value.

9. The battery management apparatus according to claim 1,
    wherein the controller is configured to restore the changed performance cycle of the at least one first task to the predetermined cycle in response to the vehicle stopping.

10. The battery management apparatus according to claim 1,
    wherein the controller is configured to:
    monitor a load of the battery management apparatus; and
    increase a performance cycle of at least one second task based on the monitoring result.

11. The battery management apparatus according to claim 1,
    wherein the controller is configured to:
    monitor a load of the battery management apparatus; and
    perform a second change to the performance cycle of the at least one first task based on the monitoring result, wherein the second change increases the performance cycle of the at least one first task.

12. A battery pack, comprising the battery management apparatus defined in claim 1.

13. A vehicle, comprising the battery management apparatus defined in claim 1.

* * * * *